United States Patent [19]

Uchida

[11] 3,909,806

[45] Sept. 30, 1975

[54] ANALOGUE MEMORY DEVICE

[75] Inventor: Yukimasa Uchida, Yokohama, Japan

[73] Assignee: Tokyo Shibaura Electric Co., Ltd., Japan

[22] Filed: July 15, 1974

[21] Appl. No.: 488,776

[30] Foreign Application Priority Data

July 13, 1973 Japan .............................. 48-78479

[52] U.S. Cl. ............................ 340/173 R; 307/238

[51] Int. Cl. ............................................ G11c 11/40

[58] Field of Search .......... 340/173 R; 307/238, 279

[56] References Cited

UNITED STATES PATENTS 3,373,295 3/1968 Lambert ......................... 340/173 R

*Primary Examiner*—Terrell W. Fears

*Attorney, Agent, or Firm*—Oblon, Fisher, Spivak, McClelland & Maier

[57] ABSTRACT

An analogue memory device comprising means for alternately applying a writing pulse and an input analogue information pulse to be memorized to a nonvolatile memory element; means for detecting by comparison whether the memorized analogue information pulse in the memory element is as large in value as the input analogue information pulse; means for halting the operation of applying the writing pulse and input analogue information pulse to the memory element when the memorized analogue information pulse is as large in value as the input analogue information pulse.

11 Claims, 13 Drawing Figures

ANALOGUE MEMORY DEVICE

BACKGROUND OF THE INVENTION

1. Field of the Invention

The present invention relates, in general, to an analogue memory device, and in particular, to an analogue memory device having a nonvolatile memory element such as a nonvolatile semiconductor memory which can memorize analogue information as a value of the threshold voltage of the memory element.

2. Description of the Prior Art

Recent advances in semiconductor nonvolatile memories have made it possible to store charges in the insulating layers for the purpose of nonvolatile operation. The mechanism of injection of carriers from the semiconductor substrate into traps of floating gates within the insulating layers has been explained in terms of the tunneling current or the avalanche injection current. The storage of injected carriers in traps or floating gates within the insulating layers is expected to be utilized for nonvolatile analogue information storage. However, the application of nonvolatile memory elements to an analogue memory device is still in the development state. For example, a MAOS (Metal-Aluminum-Oxide-Silicon) transistor has been used as a nonvolatile analogue memory in which information is written by means of light. In this case, information is nonvolatilely memorized by converting the quantity of light into the value of the threshhold voltage by utilizing the fact that the threshhold voltage varies depending on the light applied to a transparent gate electrode. More particularly, the threshhold voltage varies depending on the quantity of light.

It is also known that the value of the threshhold voltage of a nonvolatile semiconductor memory can be utilized to write information by applying voltage to the semiconductor memory. However, it has been difficult to realize a high accuracy analogue memory by known techniques.

This is because the writing charateristics of the nonvolatile memory, (i.e., the characteristics of the threshhold voltage after writing versus the writing voltage and writing pulse width, or the quantity of light when light is used in writing) vary from each lot, wafer, chip or element depending on the manufacturing process of the element. As a result, the threshhold voltage of each memory after writing varies even though the same specific writing voltage amplitude, writing pulse width or quantity of light is applied to each memory. Further, since the writing characteristics of such a nonvolatile semiconductor memory are not lineal with respect to writing conditions such as writing voltage, pulse width or quantity of light, etc., it is quite difficult to translate input information into writing conditions. Accordingly, lineality of the input information versus analogue information after writing cannot be attained. Thus, when the non-volatile semiconductor memory is used as an analogue memory, it is difficult to obtain high resolution. Further, it is also difficult to realize a high precision analogue memory due to the complex non-lineality of the writing characteristics.

SUMMARY OF THE INVENTION

Accordingly, it is one object of the present invention to provide a new and improved unique analogue memory device which can nonvolatilely memorize analogue information.

Another object of the present invention is to provide a new and improved nonvolatile analogue memory device having high resolution.

Still another object of the present invention is to provide a new and improved nonvolatile analogue memory device which can rewrite analogue information.

A still further object of the present invention is to provide a new and improved nonvolatile analogue memory device which may be utilized for a comparison between the input analogue information and the memorized information regardless of differences in writing characteristics and which displays lineality between input analogue information and memorized information regardless of non-lineality writing characteristics.

Other objects will appear hereinafter.

Briefly, in accordance with the invention, the foregoing and other objects are attained by an analogue memory device comprising an analogue memory device comprising means for alternately applying a writing pulse and an input analogue information pulse to be memorized to a nonvolatile memory element; means for detecting by comparison whether the memorized analgoue information pulse in the memory element is as large in value as the input analogue information pulse; means for halting the operation of applying the writing pulse and input analogue information pulse to the memory element when the memorized analogue information pulse is as large in value as the input analogue information pulse.

BRIEF DESCRIPTION OF THE DRAWINGS

Other objects and features of the invention will be better understood by reference to the following detailed description when considered in connection with the accompanying drawings, wherein.

DETAILED DESCRIPTION OF THE PREFERRED EMBODIMENTS

Figure 1:
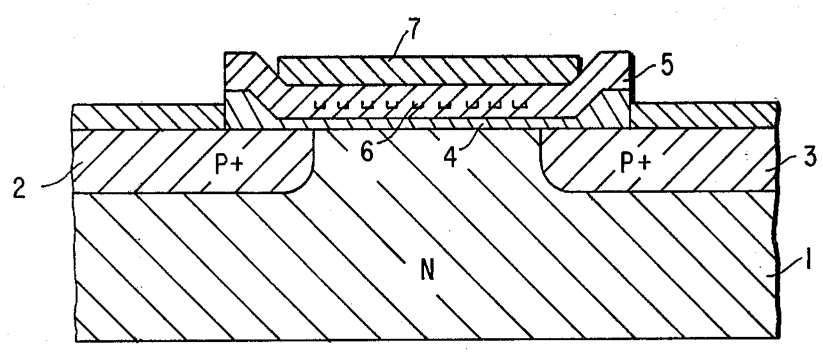
FIG. 1 illustrates a cross-section of a MNOS transistor used as a memory element in one preferred embodiment of the present invention.

Referring now to the drawings, wherein like reference numerals indicate identical or corresponding parts throughout the several views and more particularly to FIG. 1 thereof, a cross-sectional view of a MNOS (Metal-Nitride-Oxide-Silicon) transistor which is used as one example of a nonvolatile memory cell in accordance with the present invention is shown. This transistor is a P-channel field effect transistor which comprises an N-type substrate 1, P+-type source 2, P+-type drain 3 and an insulating layer. The insulating layer is formed in a two layer structure of a silicon oxide layer 4, having, for example, about 25A thickness and a silicon nitride layer 5 having, for example, about 600A thickness. In the vicinity of the interface of the silicon oxide layer 4 and the silicon nitride layer 5, there exists traps 6 which capture or release electrons so that electron density in the traps 6 can be controlled by applying positive or negative voltage to a gate 7 against the substrate 1 or the source 2. If positive voltage is applied to the gate 7 against the substrate 1, electrons are injected to the traps 6 from the substrate 1 through a thin silicon oxide layer 4, by tunneling injection whereby the threshhold voltage of the transistor shifts in a positive direction. If negative voltage is applied to the gate 7, electrons are emitted from the traps 6 to the side of the silicon oxide layer 4 by a tunneling effect whereby the threshhold voltage shifts in a negative direction.

Figure 2:
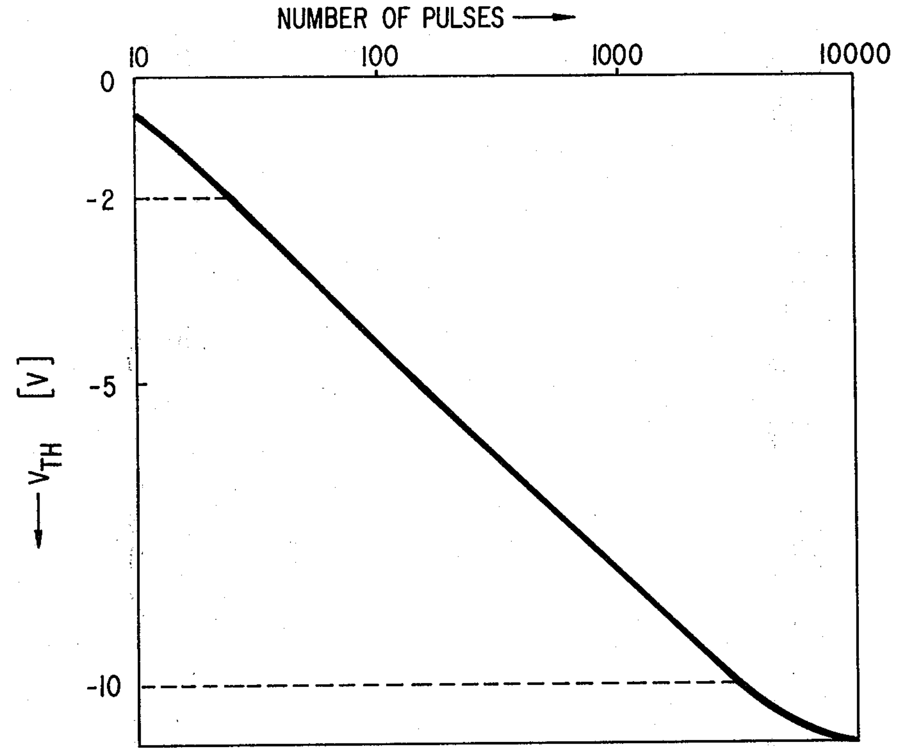
FIG. 2 is a characteristics chart of the MNOS transistor shown in FIG. 1.

FIG. 2 shows the threshhold voltage $V_{TH}$ shift of the MNOS transistor versus the number of pulses applied to the gate 7. The curve shown in FIG. 1 largely depends on the manufacturing process and varies from each lot, wafer, chip and element.

Figure 3:
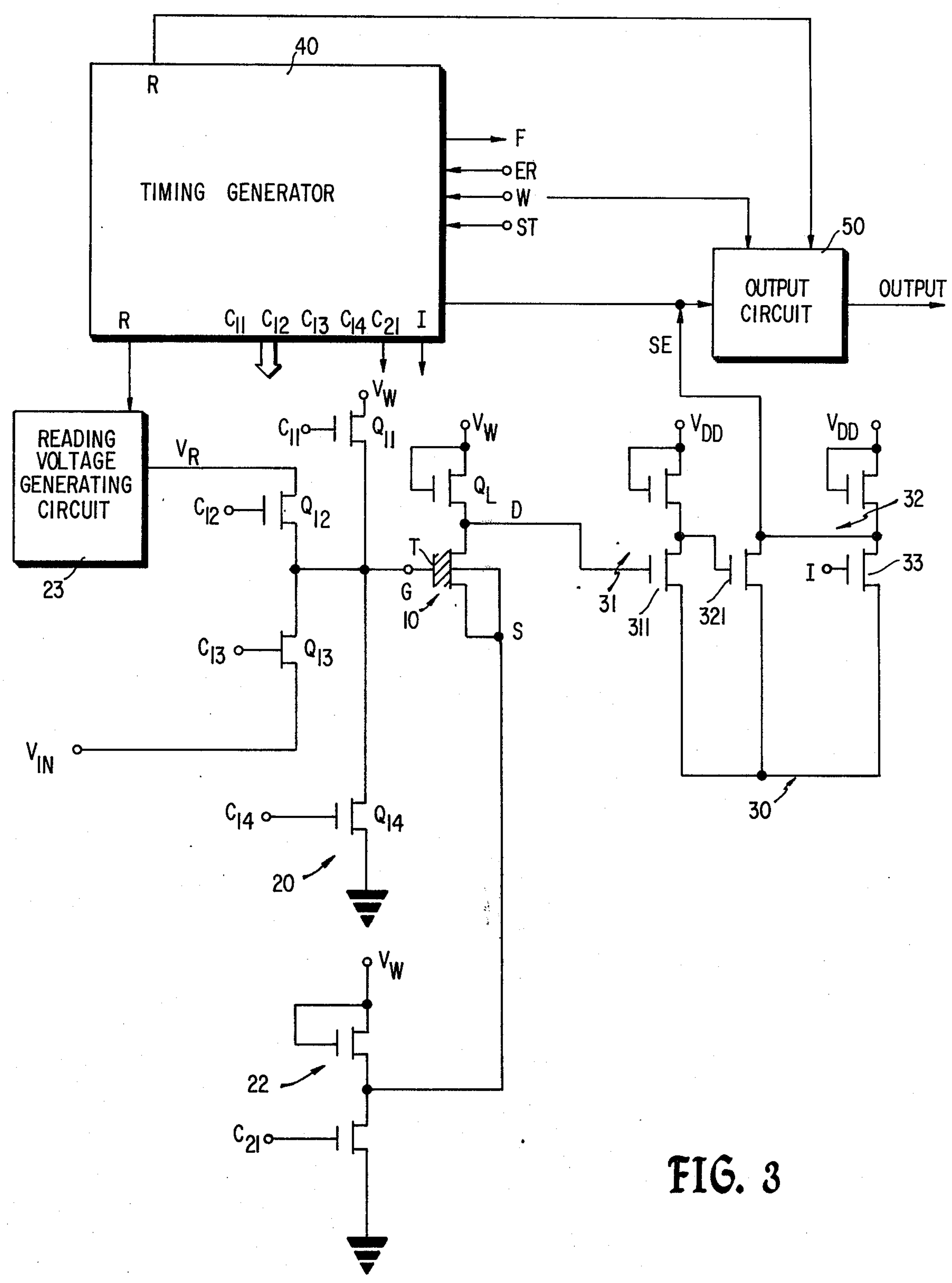
FIG. 3 illustrates a schematic circuit diagram of an analogue memory device associated with a nonvolatile analogue memory cell according to one preferred embodiment of the present invention.

FIG. 3 shows a schematic circuit diagram of the analogue memory device according to one preferred embodiment of the present invention which can memorize analogue values with high accuracy by overcoming the non-lineality and dispersion. The circuit comprises a memory cell or element 10, read-write circuit 20, detecting circuit 30, timing generator 40 and output circuit 50. The memory cell 10 may, by way of example, be a P-channel MNOS transistor T. The drain of memory transistor T is connected to an input terminal of a load transistor $Q_L$ and a detecting circuit 30. The source of memory transistor T is connected to an erasing circuit 22 in order to erase the memorized information in the memory transistor T. The erasing circuit 22 may be an inverter circuit formed by a MOS (Metal-Oxide-Semiconductor) transistor. The output terminal of the inverter circuit is connected to the source and substrate of a memory transistor T. The gate of memory transistor T is connected to a read-write circuit 20 which consists of four switching transistors $Q_{11}$, $Q_{12}$, $Q_{13}$ and $Q_{14}$ whose gates are controlled by timing generator 40. The switching transistors may be insulated gate field effect transistors such as MOS transistors. The source of switching transistor $Q_{11}$ is connected to the gate of memory transistor T. Writing voltage $V_W$ is applied to the drain of switching transistor $Q_{11}$ in order to write analogue information therein.

The drain of switching transistor $Q_{12}$ is connected to a reading voltage generating circuit 23 which is controlled by a timing pulse from the output of timing generator 40 and which generates a saw-tooth voltage as a reading voltage $V_R$. The source of switching transistor $Q_{12}$ is connected to the gate of memory transistor T. The source of switching transistor $Q_{13}$ is connected to the gate of memory transistor T and an input analogue information voltage $V_{IN}$ is applied to the drain of switching transistor $Q_{13}$. The drain of switching transistor $Q_{14}$ is connected to the gate of memory transistor T. The source of switching transistor $Q_{14}$ is connected to ground in order to stabilize the gate of memory transistor T. The timing generator 40 may, by way of example, comprise an ordinary MOS P-channel enhancement type transistor having a threshhold voltage of −1.5V.

The detecting circuit 30 may comprise two stage inverter circuits 31 and 32 connected in cascade. The input terminal of the first stage inverter circuit 31 is connected to the drain of memory transistor T. The output terminal of inverter circuit 31 is connected to the input terminal of the second stage inverter circuit 32. The inverter circuit 32 generates detecting signals SE as a control signal for the timing generator 40 and the output circuit 50. A switching transistor 33, which may be a MOS transistor, is connected in parallel to the output terminal of second inverter circuit 32. The gate of switching transistor 33 is controlled by a timing pulse generated from the output terminal I of timing generator 40. The timing generator 40 which has output terminals R, $C_{11}$, $C_{12}$, $C_{13}$, $C_{14}$, $C_{21}$ and I generates predetermined timing pulses from its respective output terminals when a write-read signal W, erasing signal ER or start signal ST is applied thereto. At the conclusion of operations, the timing generator 40 generates a finish signal F.

Figures 4A, 4B, 4C, 4D:
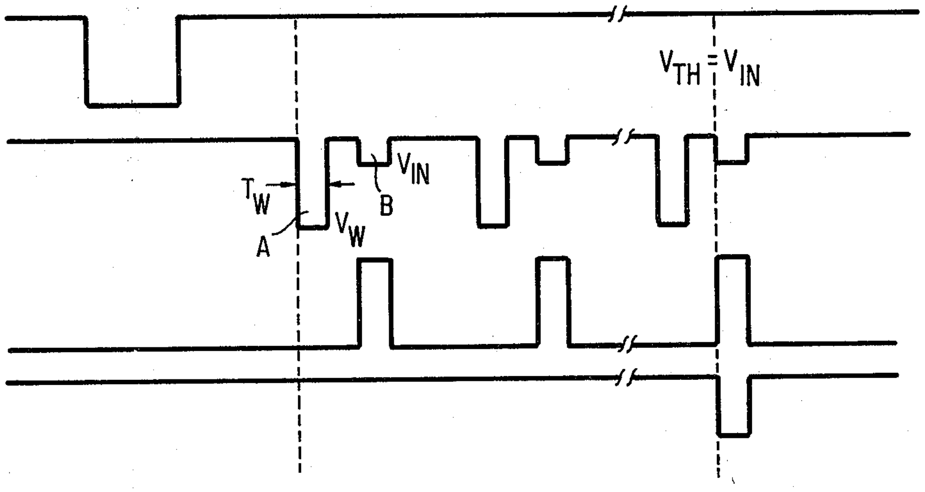
FIGS. 4A through 4D and 5A through 5E taken together constitute a timing diagram for the operation of the analogue memory device of FIG. 3.

The operation of the circuit shown in FIG. 3 will now be explained in detail in conjunction with FIG. 4. The writing operation will be explained first. When the erasing signal ER is applied to the timing generator 40, the control signal from the output terminal 21 is applied to the input terminal of erasing circuit 22 which in turn generates a pulse output as shown in FIG. 4A which is applied to the source and substrate of memory transistor T. Thus, the positive voltage is applied to the gate of memory transistor T with respect to the substrate thereof which sets the initial value of the memory transistor T. This operation is termed an erasing operation. For explanation purposes, assume that the memory transistor T can memorize an analogue information value $V_{IN}$ ranging from −2V to −10V which corresponds to the available threshhold voltage range of the memory transistor T as shown in FIG. 2.

In this example, $-2V < V_{IN} < -10V$. During writing, when mode signals W and start signals ST are applied to timing generator 40, control signals are generated from the output terminals $C_{11}$, $C_{13}$ and I which are applied to the gates of switching transistors $Q_{11}$ and $Q_{13}$. The switching transistor $Q_{11}$ applies pulse voltage A having pulse width $T_W$ and pulse amplitude $V_W$ with the timing shown in FIG. 4B to the gate of memory transistor T as a writing voltage. Input analogue information is applied to the gate of memory transistor T through the switching transistor $Q_{13}$ as a voltage $V_{IN}$ as shown (B) in FIG. 4B. The two above-described pulses are generated alternately as shown in FIG. 4B and control the switching transistors $Q_{11}$, $Q_{13}$ and $Q_{14}$. When the pulse A shown in FIG. 4B is applied, the threshhold voltage of the memory transistor T is shifted gradually in the negative direction. Thus, the writing pulse and the analogue information pulse are repeatedly applied to the gate of memory transistor T. When the threshhold voltage of memory transistor T becomes as large as the input analogue information voltage value, the memory transistor T becomes nonconducting with respect to the input analogue voltage $V_{IN}$. Until the threshhold voltage becomes as large as the input analogue information voltage $V_{IN}$, the memory transistor T conducts whenever the analogue information voltage $V_{IN}$ is applied to the gate thereof. The detecting circuit 30 detects conduction and nonconduction of the memory transistor T. When and after the mode signal W is obtained during the above operation, the control signal shown in FIG. 4C is applied to the switching transistor 33 of detecting circuit 30 in order to prevent the generation of detecting signal SE during the time memory transistor T is nonconducting.

When the threshhold voltage of memory transistor T becomes as large as the input analogue information voltage $V_{IN}$ and the memory transistor T becomes nonconducting, the voltage of the drain of memory transistor T becomes nearly equal to the power voltage $V_W$ through the load transistor $Q_L$. Then, the switching transistor 311 conducts and the output terminal of the inverter circuit becomes nearly equal to ground. Therefore, the switching transistor 321 of the second stage inverter circuit 32 turns off. At this time, switching transistor 33 is also off with the result that the drain voltage of each switching transistor becomes almost as large as power voltage $V_{DD}$ and generates a pulse as shown in FIG. 4D as a detecting signal SE. The detecting signal SE is applied to the timing generator which in turn ceases generating control signals from the outputs $C_{11}$, $C_{13}$ and I. Thus, when the threshhold voltage of memory transistor T becomes as large as the input analogue information voltage $V_{IN}$, the writing operation is terminated.

In accordance with the above-described writing operation, as the writing operation is terminated when the written information value, which is equal to the threshhold voltage, becomes as large as the input analogue information value, the threshhold voltage of each memory transistor changes to the input analogue information value even though the characteristics of each memory transistor are different with respect to each other. Thus, it is possible to write the input analogue information $V_{IN}$ as the threshhold voltage of a nonvolatile memory transistor without being detrimentally affected by the characteristics of respective memory transistors even though the memory transistors used have non-lineal characteristics or dispersion with respect to each other.

The reading operation in accordance with the present invention will be explained with reference to FIG. 5.

Figures 5A, 5B, 5C, 5D, 5E:
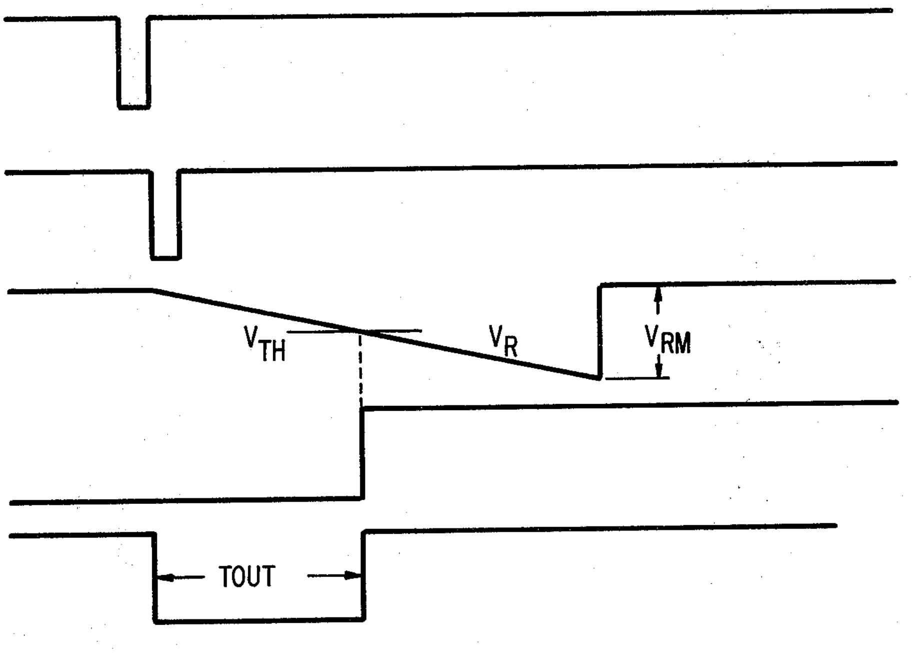

When the start signal ST as shown in FIG. 5A is applied to the timing generator 40, during the reading mode W = 0, the output terminal R generates a control signal as shown in FIG. 5B. At the same time, output terminal $C_{12}$ turns switching transistor $Q_{12}$ on and turns switching transistors $Q_{11}$, $Q_{13}$ and $Q_{14}$ off. This control signal is applied to the output circuit 50 as well as to the reading voltage generating circuit 23. The reading voltage generating circuit 23 generates a reading voltage $V_R$ in the form of a saw-tooth wave voltage as shown in FIG. 5C and applies it to the gate of memory transistor T when the control signal is applied. When the reading voltage $V_R$ exceeds the threshhold voltage, i.e., the analogue information voltage which is memorized in the memory transistor T, the memory transistor T conducts which conduction is detected by the detecting circuit 30 which generates the detecting signal SE as shown in FIG. 5D. This detecting signal SE is applied to the output circuit 50. The output circuit 50 generates a pulse width modulated signal having a pulse width $T_{OUT}$ which corresponds to the control signal generated from output terminal R to the reading voltage generating circuit 23 for detecting the detecting signal SE as shown in FIG. 5E.

It will be understood that the analogue information can also be read out by sampling the reading voltage $V_R$ at the time when the detecting signal SE changes. In this case, the amplitude of the sampled pulse represents the memorized analogue information.

Figure 6:
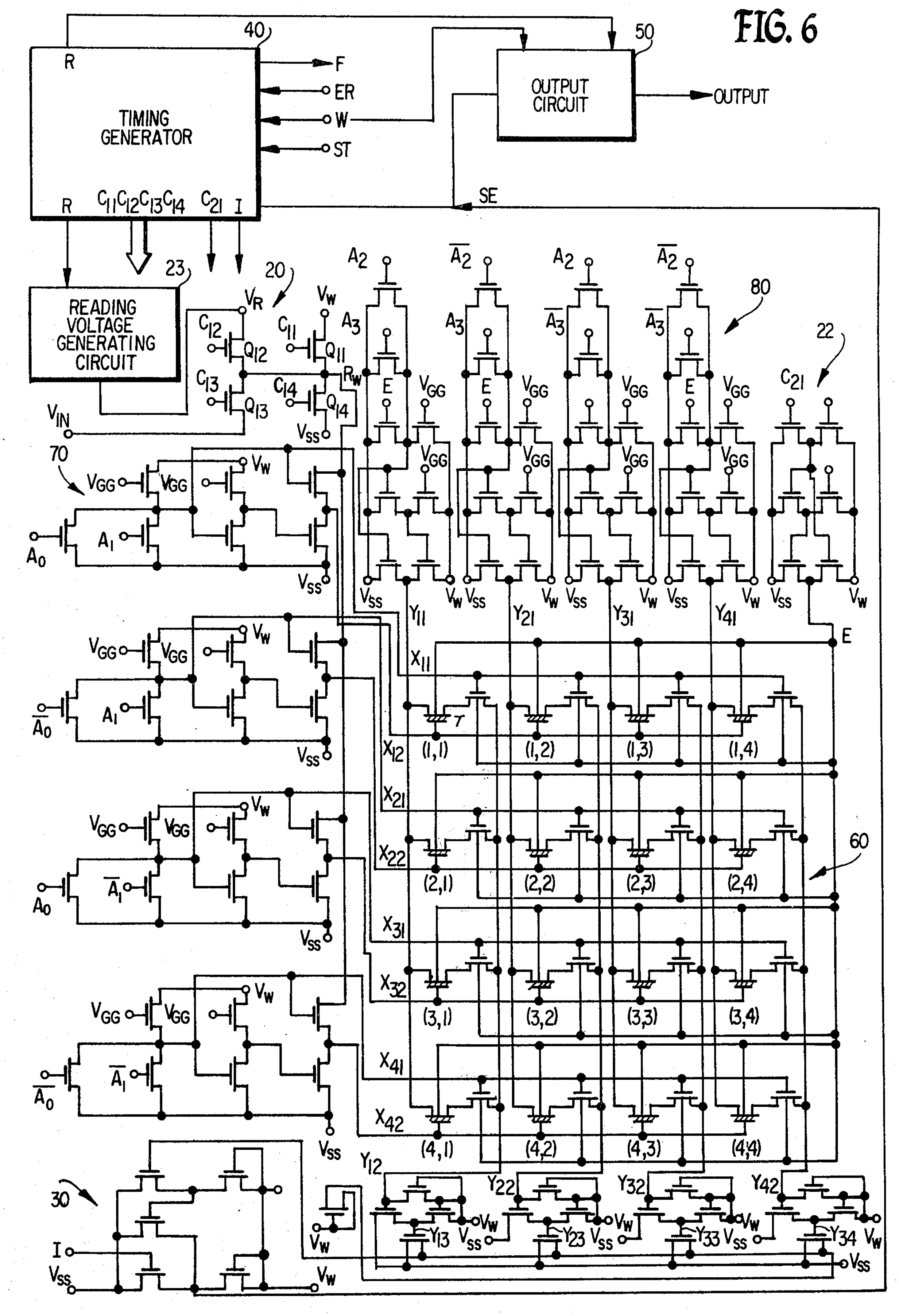
FIG. 6 is a schematic circuit diagram of an analogue memory device containing an array of nonvolatile analogue memory elements according to another embodiment of the present invention.

FIG. 6 shows another embodiment of the analogue memory device according to the present invention in which an array 60 includes 16 memory transistors. Each memory transistor T is identical to the memory transistor T previously described with regard to FIG. 3. The array may be integrated into a semiconductor wafer. As shown in FIG. 6, the analogue memory device can be constructed by adding only a read-write circuit 20 and a timing generator 40 which drives the read-write circuit 20.

The operation of the analogue memory device shown in FIG. 6 will be explained. At the time of erasing, the signal from the output terminal $C_{21}$ of timing generator 40 is applied to an erasing circuit 22 by setting an erasing signal ER=1 at mode signal W=1 whereby a large negative voltage is generated at terminal E. All the $X_{i2}$ ($i = 1 \sim 4$) lines are grounded by causing the switching transistor $Q_{14}$ to conduct by a signal from the terminal $C_{14}$ so that the analogue information memorized in memory transistors (1,1)~(4,4) is simultaneously erased.

In writing, when a start signal ST appears at mode signal W=1, only the specified cell i,j is selected by an X decoder 70 and a Y decoder 80. Then, the same writing operation as explained with regard to FIGS. 3 and 4 is performed. Assuming that the cell 1,1 is selected and terminals $A_0$ and $A_1$ of X decoder 70 are at zero volts, terminals $\overline{A}_0$ and $\overline{A}_1$ of X decoder 70 are at negative voltage, terminals $\overline{A}_2$ and $\overline{A}_3$ of Y decoder 80 are at zero volts and terminals $A_2$ and $A_3$ of Y decoder 80 are at negative voltage. Then, the potential of the $X_{11}$ line of the X decoder 70 becomes $V_W$ volt and the potential of the $X_{21}$, $X_{31}$ and $X_{41}$ lines becomes zero. Therefore, a reading voltage and writing voltage (potential of line RW) are applied to the line $X_{12}$ and the potential of lines $X_{22}$, $X_{32}$ and $X_{42}$ becomes zero. With regard to the Y decoder 90, the potential of line $Y_{11}$ becomes zero and lines $Y_{21}$, $Y_{31}$ and $Y_{41}$ become $V_W$ (more correctly, $V_W - V_{th}$). By this operation, it becomes possible to write information only in the cell 1,1 or to read information only from the cell 1,1. This is because the writing voltage is applied to only the line $X_{12}$ and the other lines $X_{i2}$ (i = 1) have zero potential.

The line $Y_{11}$ has zero potential and the potential of lines $Y_{21}$, $Y_{31}$ and $Y_{41}$ is $V_W - V_{th}$. Therefore, the writing voltage is not applied to the cells with the exception of the memory transistor T in the cell 1,1 Even if the voltage is applied, the channel potential is $V_W - V_{th}$ so that writing is prohibited. At the time of detection, the potential $V_W$ of line $X_{11}$ turns on the MOS transistor which is connected to the lines $X_{11}$ and the zero potential of $X_{i1}$ ($i$ = 1) turns off the MOS transistor connected to the line $X_{i1}$. Since only the output $Y_{11}$ of Y decoder 80 is at zero potential and potential of the other outputs $Y_{j1}$ ($j$ = 1) is $V_W - V_{th}$, the potential of output $Y_{12}$ becomes zero or $V_W - V_{th}$ in accordance with on or off condition of the memory transistor T in the cell 1,1. However, the potential of $Y_{j2}$ ($j$ = 1) becomes negative $V_W - V_{th}$ regardless of the on or off condition of the memory transistor in the cell 1,*j*.

The write and read operation of the analogue memory device shown in FIG. 6 will be explained in conjunction with FIGS. 4 and 5.

The signal from the read-write circuit 20 is applied only to the line $X_{i2}$ of the selected row line (row i), whereby the source potential of memory transistor T arranged in row i becomes zero volts at a selected column (column *j*) and becomes a negative voltage at other columns. Thus, analogue information is written in the memory transistor T of only cell i,j by the writing pulse A shown in FIG. 4B. If The threshhold voltage of memory transistor T in cell *i,j*, becomes more negative than the input analogue voltage $V_{IN}$ by the pulse B shown in FIG. 4B and the control pulse shown in FIG. 4C, the detecting circuit 30 generates a detecting signal SE as shown in FIG. 4D whereby the application of input analogue information voltage $V_{IN}$ and the writing voltage shown in FIG. 4B to the memory transistor T in cell *i,j* is terminated. If the reading voltage $V_R$ from the reading voltage generating circuit 23 exceeds the threshhold voltage of memory transistor T in the selected memory cell *i,j*, the memory transistor T conducts and the detecting circuit 30 generates a detecting signal SE as shown in FIG. 5D whereby the memorized analogue information can be read out in the same manner described in the operation of the memory device of FIG. 3.

It will be understood from the above explanation that several kinds of information can be written in each cell of an integrated analogue memory array and can be read out, it being noted that the specified cell *i,j* can be designated optionally by the address signal $A_0$, $\overline{A}_0$, $A_1$, $\overline{A}_1$, $A_2$, $\overline{A}_2$, $A_3$ and $\overline{A}_3$. It is also clear that the analogue memory device shown in FIG. 5 can be expanded to a large capacity memory device having *m x n* memories by expanding m in row direction and n in column direction. In such a memory device, $N^{mxn}$ information can be stored assuming that each cell can store information of resolution N.

As described above, according to the present invention, input analogue information which is to be memorized is applied to memory transistors until the threshhold voltage thereof becomes as large as the input analogue information value whereby the threshhold voltage of each memory transistor shifts to the same value as the input analogue information even though the writing characteristic of the memory transistors are nonlineal and even though the memory transistors have dispersion with respect to each other. It is a relatively simple matter to determine whether a certain voltage is higher than an analogue information value at the time of reading by applying the voltage to the gate of memory transistor and detecting the conduction or nonconduction of the memory transistor.

It is also possible to re-write analogue information several times and to improve accuracy by changing the pulse width or pulse amplitude of the writing pulse, for example, by diminishing the pulse width.

Although in the above embodiment, a P channel MNOS transistor was used as a nonvolatile semiconductor memory, it should be understood that N channel MNOS transistors, P channel or N channel MAOS transistors or other insulated gate type field effect transistors are equally suitable for use in the present invention.

It should also be noted that a magnetic memory can be used as a nonvolatile memory element. It should be further noted that the writing of information can be achieved by using a direct tunnel effect, the difference between Fowler-Nordheim tunnel current and Poole-Frenkel current, the avalanche effect or by using light. If the avalanche effect is used as a writing means, it is not necessary to isolate the substrate of a memory element, for example, a MNOS transistor, from the substrate of a MOS transistor used in a related circuit. It should also be noted that P channel or N channel MIS type field effect transistors which do not include memory effects, bipolar transistors or a combination of these transistors can be used as elements to constitute circuits other then memory cells. Further, it is noted that the width or amplitude of a writing pulse may be gradually changed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An analogue memory device comprising:

means for alternately applying a writing pulse and an input analogue information pulse to be memorized to a nonvolatile memory element;

means for detecting by comparison whether the memorized analogue information pulse in the memory element is as large in value as the input analogue information pulse;

means for halting the operation of applying the writing pulse and input analogue information pulse to the memory element when the memorized analogue information pulse is as large in value as the input analogue information pulse.

2. An analogue memory device according to claim 1 wherein the nonvolatile memory element is a nonvolatile insulated gate type field effect transistor two insulator layers therein to store a charge therebetween.

3. An analogue memory device according to claim 1, wherein the nonvolatile memory element is a MNOS transistor.

4. An analogue memory device according to claim 1, wherein the nonvolatile memory element is a MAOS transistor.

5. An analogue memory device according to claim 1, wherein the nonvolatile element is a magnetic memory.

6. An analogue memory device comprising:

a nonvolatile insulated gate field effect memory transistor having a source, a drain and an insulated gate;

a first insulated gate field effect transistor having a source, a drain and an insulated gate;

a second insulated gate field effect transistor having a source, a drain and an insulated gate;

means connecting the source of the first insulated gate field effect transistor to the gate of the memory transistor;

means for applying a writing pulse to the drain of the first insulated gate field effect transistor;

means for applying an input analogue information pulse to be memorized to the source of the second insulated gate field effect transistor;

means connecting the drain of the second insulated gate field effect transistor to the gate of memory transistor and a detecting circuit connected to the source of the memory transistor for detecting whether the memorized analogue information pulse in the memory transistor is as large in value as the input analogue information pulse.

7. An analogue memory device according to claim 6 further comprising:
- a reading voltage generating circuit;
- a third insulated gate field effect transistor having a source, a drain and an insulated gate;
- means connecting the drain of the third insulated gate field effect transistor to an output of the reading voltage generating circuit;
- means connecting the source of the third insulated gate field effect transistor to the gate of the memory transistor and
- an output circuit connected to an output of the detecting circuit for generating an output signal.

8. An analogue memory device according to claim 6 further comprising:
- an erasing circuit connected to the source of the memory transistor.

9. An analogue memory device according to claim 6 in which the memory transistor comprises several non-volatile insulated gate field effect memory transistors arranged in an array.

10. An analogue memory device according to claim 9 further comprising means for selecting one of the memory transistors arranged in an array.

11. An analogue memory device according to claim 9, in which the memory transistor array is integrated into a semiconductor wafer.

* * * * *